W. SELTNER.
JIGGER.
APPLICATION FILED MAR. 20, 1906.

987,179.

Patented Mar. 21, 1911.
3 SHEETS—SHEET 1.

W. SELTNER.
JIGGER.
APPLICATION FILED MAR. 20, 1906.
987,179.
Patented Mar. 21, 1911.
3 SHEETS—SHEET 2.
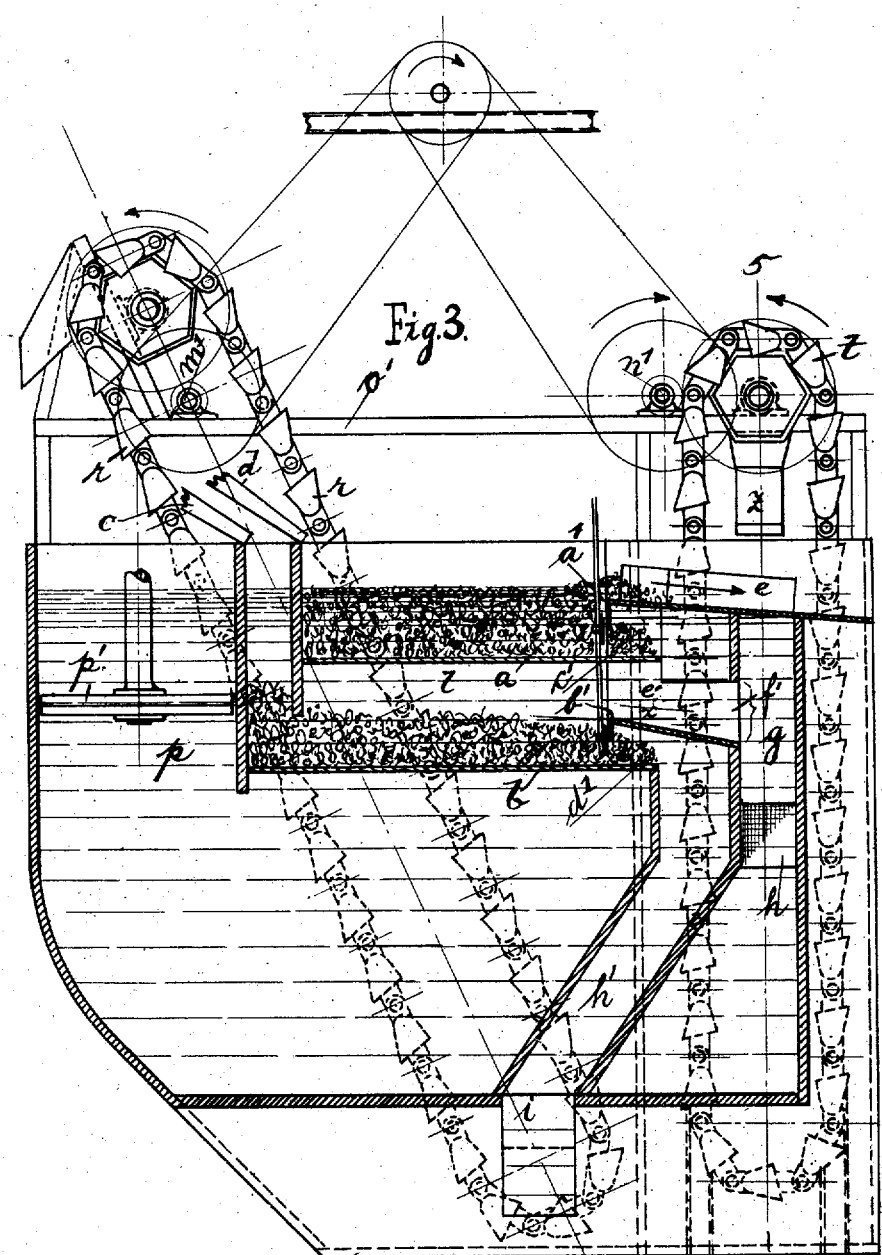

W. SELTNER.
JIGGER.
APPLICATION FILED MAR. 20, 1906.

987,179.

Patented Mar. 21, 1911.
3 SHEETS—SHEET 3.

UNITED STATES PATENT OFFICE.

WILHELM SELTNER, OF SCHLAN, AUSTRIA-HUNGARY.

JIGGER.

987,179.  Specification of Letters Patent.  Patented Mar. 21, 1911.

Application filed March 20, 1906.  Serial No. 307,123.

*To all whom it may concern:*

Be it known that I, WILHELM SELTNER, a subject of the Emperor of Austria-Hungary, residing at Schlan, Bohemia, Empire of Austria-Hungary, have invented certain new and useful Improvements in Jiggers, of which the following is a specification.

As is well known, in order to regulate the stroke of the material to be sorted on jiggers, below the screen proper, there was used a second "meal" bed, by the adjustment of which the screen was regulated.

The method according to this invention consists in effecting the separation on two or more superposed screens in the same separating chamber or hutch of a jigger. This process must not be confounded with the separation by means of two superposed movable screens in water or on fixed superposed screens in "pulsating" water, in which the material or part of the material passes through the screen for the purpose of effecting the desired separation.

The material treated on the superposed screens can be of different kinds and sizes of grain, but in most cases it is preferable to supply the upper screens with the finer, and the lower screens with the coarser, or both with the same kind of material, the separation and discharge of the material supplied to each screen being effected above the screen surface.

Figure 1:
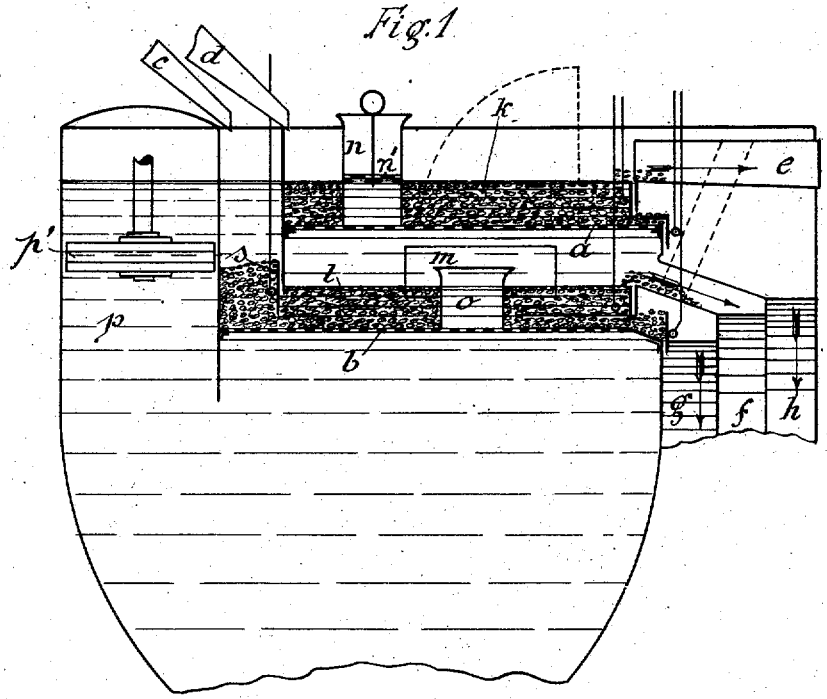
Figure 2:
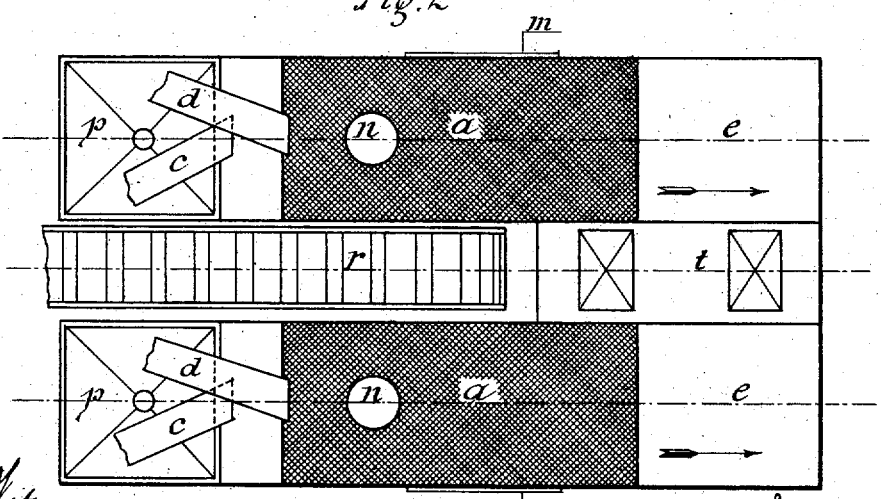

In the accompanying drawing:—Figures 1 and 2 show, by way of example, in cross-section and plan respectively, two jiggers arranged side by side, on which the material can be treated by the method according to this invention. Fig. 3 shows a longitudinal section of the jigger with the transport devices (bucket elevators), Fig. 4 a plan and Fig. 5 is a transverse sectional view on line 5—5 of Fig. 3.

Referring now to Figs. 1 and 2 only:—
The jiggers are provided with two superposed screens $a$ and $b$. Water is forced up in the well-known manner from the pressure-chamber $p$ by means of a piston $p'$, etc. The inlets and discharges for the material can also be arranged on the jigger in various ways. In the construction illustrated, for instance, raw material is supplied at $c\ d$ to the screens. The discharge of the lighter particles takes place on the same side of the two screens at $e\ f$, and of the specifically heavier particles at $g\ h$, whence the products are supplied to bucket elevators or similar devices at $r$ and $t$, more fully described in reference to Figs. 3–5, (for the purpose of depriving them of water, sorting and shipping). A water outlet is arranged only at $e$ with the discharge of the specifically lighter portions of the material at the upper screen $a$.

In order to adapt the rising or pressure of water for the upper screen to the requirements of each case and to enable it to be regulated, it is preferable to arrange a pipe $n$ leading from the water chamber $l$ of the bottom screen, to project beyond the level of water, the pipe being such that its cubic contents can be increased or reduced by means of an adjustable device such as a piston $n'$ which can be adjusted up and down in the pipe $n$. In this way the pressure of water when excessive for the proper screening on the upper screen, may be compensated by the pipe. If, however, it is desired to have a stronger pressure of water in the upper screen, pipes $o$ are arranged to lead from the bottom box or hutch of the jigger above the bottom screen, that is to say up to below the upper screen. A valve $s$ regulates the inlet for the raw material to the bottom screen and moreover, for the purpose of rendering all the parts accessible, the jigger is provided with folding screen portions $k$ and a manhole $m$.

Figure 5:
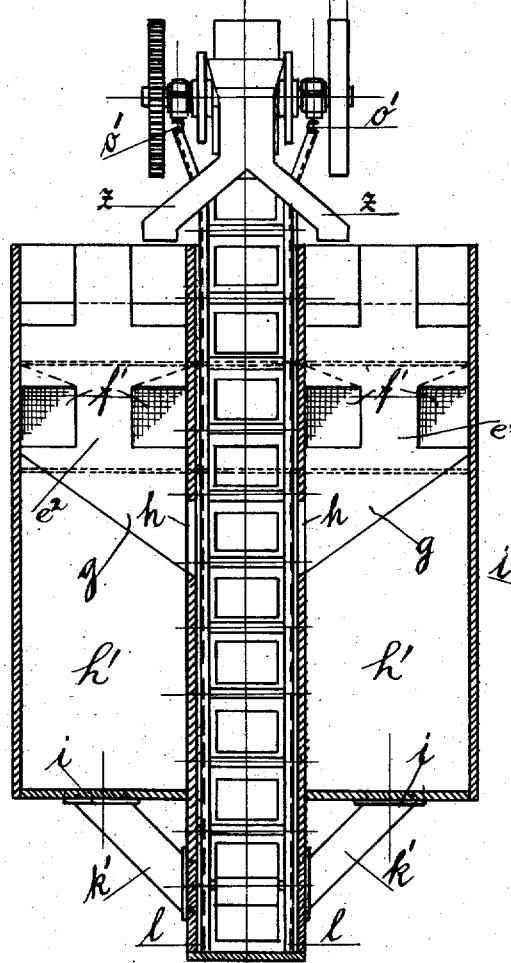
Figure 4:
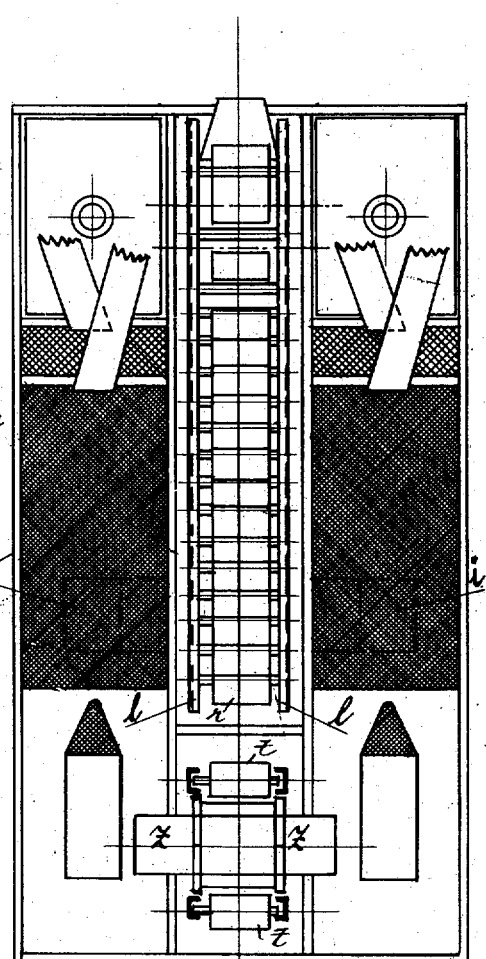

Referring now to Figs. 3–5 illustrating more particularly the conveying devices:—
The specifically lighter material passes over the edge $a'$ or $b'$, while the specifically heavier material is discharged through the slot $c'$ or $d'$. The further course of the material is as follows:—The lighter kind from the upper sieve is carried off direct by the water current. The lighter kind from the lower seive falls over ehe edge $b'$ through the aperture $e'$ to the openings $f'$ and arrives through the latter into the compartment $g$. The material slides over the oblique bottom of this division and falls through the openings $h$ into the trough of the vertical bucket elevators. By the latter the material of the lower sieve is lifted, is united at the top by means of a hose-like discharge channel $z$ of the same kind as that of the upper sieve and is discharged with same.

The aforementioned aperture $e'$ is formed in such manner that it guides, as already described, the lighter material of the lower sieve to the openings $f'$, while the heavy material of the upper sieve is guided down through the aperture or channel $e'$ by a chute or hopper $e^2$ (Figs. 3 and 5) which is situated in the middle of the width of said aperture $e'$ so that the said heavy material can pass down into the chamber $h'$. In $h'$ this heavy kind from the upper sieve mixes with the same kind from the lower sieve and slides as far as the opening $i$ and through the connecting piece $k'$ into the trough of the oblique bucket elevators which discharge all the heavy material for further conveyance. The actuation of the two bucket elevators takes place by means of the transmission which moves the first-motion-shaft $n'$ or $m'$ by means of belt-transfer and from there drives the wind-beam by means of toothed wheels. The wind-beam and the first-motion shaft of the vertical bucket elevators are mounted on the supporting frame $o'$. The latter is mounted above the jigger and serves also as a support for the frame of the oblique bucket elevators.

What I claim as my invention and desire to secure by Letters Patent is:—

1. A jigger having a water chamber, a plurality of superposed screens therein of fine mesh through which the material treated cannot pass, means for forcing the water alternately upward and downward through the screens, means for applying the material to be treated to the screens and means for discharging the lighter and heavier materials separately from above the surface of each of the screens.

2. A jigger having a water chamber, a plurality of superposed screens therein of fine mesh through which the material treated cannot pass, means for forcing the water alternately upward and downward through the screens, independent means for regulating the pressure of water forced through the various screens, means for supplying the material to be treated to the screens and means for discharging the lighter and heavier materials separately from above the surface of each of the screens.

3. A jigger having a water chamber, a plurality of screens arranged one above another in the water chamber, means for forcing the water alternately upward and downward through the screens, a pipe extending upward from the water space of the lower screen, and means for varying the operative cubic content of said pipe.

4. A jigger having a main water chamber, a plurality of screens for the material to be treated said screens being arranged one above the other in the main water chamber, a pressure chamber communicating with the main water chamber, a piston capable of reciprocating in the pressure chamber and forcing the water alternately upward and downward through the screens, a pipe extending upward from the water space of the lower screen and means for varying the operative cubic content of said pipe, means for supplying the material to be treated to the screens, and means for discharging the lighter and heavier materials separately.

5. A jigger having a main water chamber, a plurality of screens for the material to be treated, said screens being arranged one above the other in the main water chamber, a pressure chamber communicating with the main water chamber, a piston capable of reciprocating in the pressure chamber and forcing the water alternately upward and downward through the screens, a pipe extending upward from the water space of the lower screen, means for varying the operative cubic content of said pipe, supply chutes arranged at one end, separate discharge chutes for the lighter and the heavier materials arranged at the opposite ends of the screens to those at which the supply chutes are arranged, and means for controlling the supply and discharge.

6. A jigger having a water chamber, a plurality of screens arranged one above another in the water chamber, means for forcing the water alternately upward and downward through the screens, a pipe leading from the bottom box of the jigger and ending in the water space above the lower screen.

7. A jigger having a main water chamber, a plurality of screens for the material to be treated, said screens being arranged one above the other in the main water chamber, a pressure chamber communicating with the main water chamber, a piston capable of reciprocating in the pressure chamber and forcing the water alternately upward and downward through the screens, a pipe leading from the bottom box of the jigger and ending in the water space above the lower screen, means for supplying the material to be treated to the screens, and means for discharging the lighter and heavier materials separately.

8. A jigger having a main water chamber, a plurality of screens for the material to be treated, said screens being arranged one above the other in the main water chamber, a pressure chamber communicating with the main water chamber, a piston capable of reciprocating in the pressure chamber and forcing the water alternately upward and downward through the screens, a pipe leading from the bottom box of the jigger and ending in the water space above the lower screen, supply chutes arranged at one end, separate discharge chutes for the lighter and heavier materials arranged at the opposite ends of the screens to those at which the supply chutes are arranged, and means for controlling the supply and discharge.

In testimony whereof I have signed my name to this specification in the presence of two subscribing witnesses.

WILHELM SELTNER.

Witnesses:
ADOLPH FISCHER,
ARTHUR SCHWEINBURG.

Copies of this patent may be obtained for five cents each, by addressing the "Commissioner of Patents, Washington, D. C."